US006983253B1

(12) United States Patent
Maul et al.

(10) Patent No.: US 6,983,253 B1
(45) Date of Patent: *Jan. 3, 2006

(54) PROCESS FOR PROVIDING A PRINTED AUTOMOBILE ADJUSTMENT ESTIMATE

(76) Inventors: Joseph J. Maul, 984 Paisley Pl., Pickerington, OH (US) 43147; Joseph R. Maul, 984 Paisley Pl., Pickerington, OH (US) 43147

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,159

(22) Filed: Nov. 4, 1997

(51) Int. Cl.
*G06F 17/60* (2006.01)

(52) U.S. Cl. .................... 705/4; 705/29; 705/1; 705/400

(58) Field of Classification Search .............. 705/4, 705/29, 1, 400; 364/468.14; 235/61
See application file for complete search history.

(56) References Cited

U.S. PATENT DOCUMENTS

| | | | | |
|---|---|---|---|---|
| 4,435,769 A | * | 3/1984 | Nagano et al. | 705/400 |
| 5,377,098 A | * | 12/1994 | Sakai | 705/29 |
| 5,432,904 A | * | 7/1995 | Wong | 705/4 |
| 5,504,674 A | * | 4/1996 | Chen et al. | 705/4 |
| 5,561,446 A | * | 10/1996 | Montlick | 345/173 |
| 5,717,595 A | * | 2/1998 | Cherrington et al. | 705/400 |
| 5,950,169 A | * | 9/1999 | Borghesi et al. | 705/4 |

OTHER PUBLICATIONS

Fujitsu Website (http://www.fpsi.fujitsu.com/news/mpi.html), Jan. 5, 1998.*

* cited by examiner

*Primary Examiner*—Tariq R. Hafiz
*Assistant Examiner*—Akiba Robinson-Boyce
(74) *Attorney, Agent, or Firm*—Standley Law Group LLP

(57) ABSTRACT

A process for providing a printed insurance adjustment estimate includes a wireless LAN. Each portable computer is connected by a wireless system, including radio transceivers, to a file server and printer. Each portable computer includes the insurance adjusting software application. The database is stored on the server. Each of the portable computers is unable to communicate with the remainder of the portable computers. The portable computer is transported to near a vehicle which has been damaged. The names of the damaged parts are input and the estimate is printed and delivered to a customer.

4 Claims, 1 Drawing Sheet

PROCESS FOR PROVIDING A PRINTED AUTOMOBILE ADJUSTMENT ESTIMATE

BACKGROUND OF THE INVENTION

1. Field of the Invention

The present invention is directed to a process for providing a printed insurance adjustment estimate. Most particularly, the present invention is directed to the use of a wireless local area network in conjunction with portable computers in order to improve the process of creating an estimate

2. Description of the Related Art

In the insurance industry there has been a move to automate. In the past, an appraiser would take a legal pad to a vehicle and make notes at the vehicle as to parts of a car which have been damaged. The appraiser would then take his legal pad to his office and look up prices, labor times and the like in a variety of books. Then, using a form, the appraiser would calculate the amount of money it would take to repair or replace the parts, paint them and the like.

At a more recent time, a database was installed on a mainframe and a sheet was used to identify numbers on parts. This database substituted for the books previously used. The appraiser could access the database from a stand-alone computer in his office. This process was a combination of keypunch and inputting barcodes. However, the database did not improve the process of note-taking and taking the notes to the office.

These systems are unsatisfactory in the context of a drive-in estimating area. In such a case, a customer brings a vehicle in to get the estimate. Historically, an estimator or appraiser would take the notes as mentioned above and go to his office to determine the appropriate amount of the estimate. Once inside the appraiser may discover that additional information may be required from the vehicle, such as the exact portion of a part damaged or the extent of the damage which he cannot determine from the notes he took or his memory. He will then return to the car, perhaps several times. In addition, during the time the appraiser is looking up the parts, their prices and the like, the customer is often left outside waiting at a vehicle, sometimes for several minutes at a time. The customer service aspect is critically important in the auto service industry and this can create some loss of customers.

To some extent the development of the CD-Rom drive has assisted the insurance industry in this process in that it is possible to bring the data into the area where a damaged car is. However, the CD-Rom in a laptop is somewhat ineffective for this application. A CD-Rom drive is relatively fragile and can be easily damaged by the jostling which is typical in the context of a drive-in environment. In addition, the standard laptop is somewhat heavy and bulky to use. The use of a laptop is not very satisfactory when one considers that an appraiser is often looking under a car or otherwise down on his knees. The laptop is often too big to use in such a context. Thus a system is required which will allow an appraiser to remain at the car and access the database simultaneously, while maintaining the device used to access the database small in size.

There is a drawback to the wireless LAN. Because of the limitations of the radio signal, the wireless LAN has a 1.6 Mbps data transmission rate over the wireless portion. This data rate is only about ⅕ to ⅙ the rate of the standard network. The portable computers only get data and refresh their screens at a slow rate. Thus, more local processing on the tablet or pen computers is required if the speed at which the screens refresh is to remain similar to a wired LAN.

Some of the parts used in the present system have been developed by other companies. One such disclosure is a website available at http://www.fpsi.fujitsu.com/market/stlorfps.htm. This website shows a press release which indicates the use of the spread spectrum technology with a pen computer.

SUMMARY OF THE INVENTION

The use of this combination of wireless LAN and the pen computer technology allows an appraiser to introduce himself, explain the process, review the damage with the customer at the vehicle and then print the damage report, all in the presence of the customer. The accuracy of the estimate also increases. An appraiser can easily decide whether to repair versus replace a part while looking at the vehicle, so there is no reason to rely on his or her memory. The appraiser can also view the components which are shown in the database as possibly being damaged while looking at the vehicle. Because the appraiser can roam in the service area while being attached to network resources, the productivity increases and the time required to prepare an estimate decreases.

The development of portable computers has also allowed a decrease in size of the unit necessary to process the same data. A large number of "pen computers" or "tablet computers" have been developed over the last several years. These computers are similar to the laptop computer. However, many do not require the use of a mouse or a keyboard. Instead a pen- or touch-sensitive screen is used. Thus, the weight and size of the portable computer is greatly decreased and the weight of a keyboard is unnecessary.

The present invention relates to a process for determining an insurance adjustment estimate. The process includes loading an insurance adjustment application into the memory of each of a plurality of portable computers. Each of the portable computers is connected to a server by a radio transceiver attached to each of the portable computers. This forms a wireless local area network. The radio transceivers are capable of transmitting and receiving data. A database is installed on the local area network. The local area network also includes an access point. The access point is capable of transmitting data between the server and the radio transceiver. A printer is also included on the local area network.

One of the portable computers is transported to a vehicle which has been damaged. However, the portable computer must be kept within range of the access point. The names of parts which need to be replaced on the damaged vehicle are input and the estimate is printed.

The process may also include inputting additional names of additional parts which are damaged once the database on the server has been accessed from one of the portable computers. Each of the portable computers is prevented from communicating with the remainder of the portable computers. Thus, none of the portable computers can communicate with each other.

The process of installing the database on the network may include a variety of steps. The installing step may include installing a CD-ROM drive in the server and inserting a CD-ROM in the CD-ROM drive. Alternatively, the installing may include loading a database onto the hard drive in the server. As an additional alternative, the installing may include loading a database onto the hard drive in the portable computer. The installing step may also include installing a CD-ROM drive in the portable computer and inserting a CD-ROM in the CD-ROM drive.

The step of inputting the names of the damaged parts may include a variety of steps. The inputting step may include touching a visual representation of the damaged parts which appears on a screen on one of the portable computers. The touching of the visual representation may be done by a pen device which is attached to the portable computer. The inputting step may alternatively include typing the name of the damaged part through a keyboard on the portable computer.

The process may further include exporting data from the portable computer to the server and exporting data from the server to a mainframe. The process may also include accessing a mainframe from one of the portable computers and downloading information from the mainframe to one of the portable computers. Additionally, the process may include exporting data from the server to the portable computer.

The process may also include inputting the name of the customer whose vehicle has been damaged. The process may further include the step of delivering a printed estimate to a customer.

Figure 1:
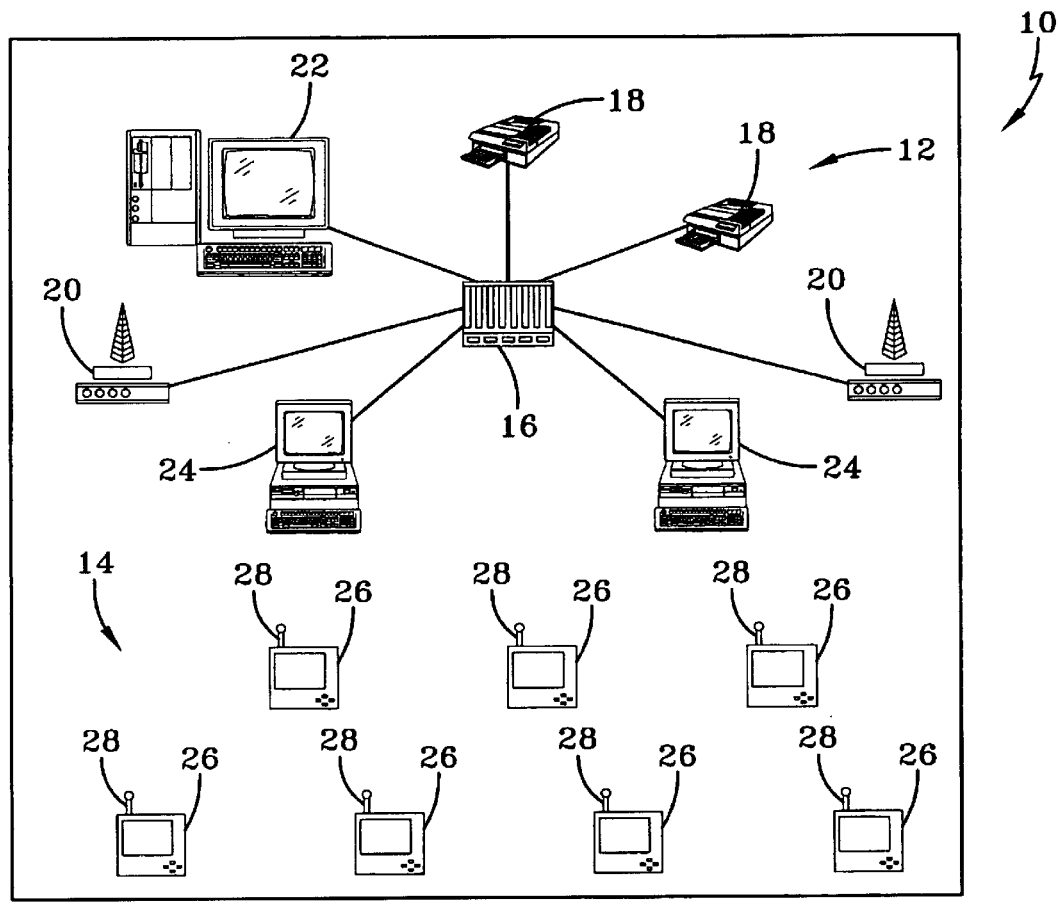
FIG. 1 is a schematic view of the LAN and wireless LAN according to the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION OF THE PREFERRED EMBODIMENT

The present invention relates to a process for determining an insurance adjustment estimate. A primary portion of the apparatus used in the invention is as shown in FIG. 1. FIG. 1 illustrates a local area network 10 which has wired components 12 and wireless components 14. Because of its use of wireless components, the local area network 10 is considered a wireless local area network (WLAN). The WLAN 10 includes a number of pieces. The WLAN includes a hub 16, one or more printers 18, one or more access points 20, a server 22 and one or more stand-alone computers 24. Not all of these parts are required, however. The critical parts are at least one access point 20, a server 22 and a printer 18. These pieces may be networked in a variety of ways currently known in the art and this disclosure should not be considered to be limited to the precise network drawing used in FIG. 1.

The WLAN 10 also includes a plurality of portable computers 26. The portable computer 26 is preferably a pen computer. The connection is made between the wired LAN components 12 and the wireless components 14 via radio transceivers. The access point 20 is a radio transceiver. Each portable computer 26 must also be equipped with a radio transceiver 28 which is compatible with the access point 20. The method of making the wireless connection may be done in a variety of ways.

A WLAN uses electromagnetic waves to communicate information from one point to another without a physical connection. The data is modulated on the carrier wave and is demodulated at the receiving end. Multiple carriers can exist at the same time and place if they are on different frequencies. To extract the data, the receiver or WLAN selects one frequency. In a typical configuration, an access point connects to a wired network by a network software program. The access point receives and transmits the data between the wired and the wireless items. End users access the WLAN through WLAN adaptors, which are cards which go in the portable computers 26. In some systems there can be multiple channels per access point and the addition of another access point can create additional channels. Some access points can interfere with each other. Various types of commercially available access points can be used to link two wired networks to each other. An access point cannot, if it is being used to link two wired networks, also be used as an access point for end users. A second access point must be used in connection therewith. However, two wireless portable computers within range of each other can set up their own network. The WLAN uses a micro-cell similar to the cellular telephone to extend the range of the wireless connectivity. At any point a portable computer is associated with only one access point. The access points' cells may overlap to allow continuous communication and allow roaming from one access point to another. Each access point can handle up to 16 users and can cover an area which extends to around 1,000 feet from the access point in a line of sight. In buildings that can be less, but a campus-like atmosphere can be set up as well to permit roaming. If additional range or additional users are needed, additional access points can be added.

There are two types of spread spectrum systems which may be used for the radio communication between the access points and the radio transceivers on the portable computers. The first is a frequency-hopping spread spectrum technology (FHSS). FHSS uses a narrow band carrier. The carrier changes frequency in a pattern known to the transmitter and receiver, i.e., each transceiver. The other technology is a direct sequence spread spectrum technology (DSSS). DSSS generates a redundant bit pattern for each bit to be transmitted. The bit pattern is called a chip code or chipping code. The longer the chip, the greater the probability that the data can be recovered if transmission is interrupted. If one or more bits is damaged in transmission, statistical techniques in each transceiver can recover the data. Many arguments persist to this day as to which system is preferable for a given application. However, either of the two systems is useful for the present invention.

A variety of providers have developed radio technology in use to create a wireless LAN. However, the preferred system is created by Proxim under the trademark RangeLAN2, which is a 2.4 GHz FHSS system. The WLAN 10 creates the network between the portable computers 26 and the wired LAN 12.

A problem with the use of the WLAN is that, in general, networking requires a lot of polling of each of the portable computers 26. However, the limits of spread spectrum technology make using it as a network often quite slow. For this reason, each portable computer 26 should have sufficient memory on a hard drive or the like in order to allow for the installation of application software. This software in this case is an insurance adjusting application. Because of the installation of the application software onto the hard drive of each portable computer 26, the speed at which data is processed is increased. The only thing that is shared on the network 10 is the database and the printer 18. The database is stored on the main server 22 and may be accessed from any of the portable computers 26. The data in the database is read-only and each user of a portable computer 26 will save only the data that is relevant to his or her work. The application may also be installed on the server 22, but need not be and is preferably not installed on the server 22. While many companies use a network such that an application is stored in the main file server as a multiuser application, such a use of an application is unsatisfactory in the wireless system as the screens required 3 to 4 minutes to refresh when using such a system. However, in this way the large database may be inserted on a file server 22 and a great deal of memory is not required on each individual portable computer 26. But the portable computer 26 only requires a minimum of memory. In this way as well only a single database and a single printer are required to support up to 16 users. All processing is done locally at the portable computer 26, but files and resources may be shared on an as-needed basis.

It is also important, however, that each pen computer 26 be isolated in order to avoid each portable computer 26 from polling all the remaining portable computers 26 and refreshing of the screens becoming even longer. Each of the portable computers 26 is prevented from talking to the remainder of the portable computers 26 and the remainder of the portable computers 26 is prevented from talking to each other portable computer 26. This system is performed with respect to each portable computer 26 such that none can communicate with any of the others.

The portable computers 26 only input data from the database as they are needed and effectively disconnect once the data is transmitted to the portable computer 26. However, the database and printer 18 can be accessed from the pen computer 26 and the entire database stored oh the server 22 can be accessed from the portable computer. Each portable computer 26 accesses a certain portion of the database, downloads the information regarding a certain part of a damaged vehicle and then does not communicate further with the server 22 until it requires additional information from the database or desires to print. The server 22 does not access any of the application programs, data or the like on any of the plurality of portable computers 26. In addition, in order to make the process move more smoothly, one of a plurality of portable computers 26 is prevented from communicating with each of the other portable computers 26 or the remainder of the portable computers 26. Since each portable computer 26 is prevented from communicating with all of the other portable computers 26, the traffic on the wireless network 14 is much lower than would otherwise be required. This allows for an easier use of the system with a quicker screen refresh time.

An number of alternatives to the above embodiment are possible. If there is sufficient memory in the hard drive in the portable computer 26, the database may be loaded into the hard drive on the portable computer 26. In such a case, the portable computer 26 would not need to access the server 22 for the data from the database and would rely on the WLAN 10 for only printing and other functions to be discussed later. A CD-ROM drive (not shown) could also be installed in the portable computer 26 and a CD-ROM containing the database could be inserted in this CD-ROM drive. The use of the CD-ROM drive in the portable computer 26 is not a recommended method due to the structural limits of the CD-ROM drive discussed above. As an additional non-preferred embodiment, part of the database could be installed on each portable computer 26 and a portable computer 26 could be permitted to access the portion of the database which is in the memory of a different portable computer 26. However, as mentioned above, the limits of the wireless technology make this embodiment less than desirable.

The portable computer 26 is preferably a Fujitsu RF 1200 tablet which is a pen-sensitive device. These computers are small, light-weight and weigh less than four pounds. Preferably, the pen computer 26 is packed into a harsh environment case to protect it while not impeding it use. However, in the case of the present application this drawback is not great since vehicles are examined in a drive-in atmosphere under cover. Most estimators are working in the shade and such a drawback is not relevant. When the Fujitsu computer is used, the radio transceiver 28 used with the Fujitsu is a Type 2 PCMCIA radio. The Fujitsu computer is considered a pen computer in that it has attached to it a pen device. When the pen device touches the screen of the computer it activates whatever portion of the screen has been touched. In this way a user uses a pen as he or she would a mouse.

While the pen technology is preferred, other methods of data entry are also permissible as will be discussed later. Other methods include touch-screen, mouse, keyboard and the like. While it is not recommended in this environment due to noise constraints, a voice-activated system is also possible.

A variety of types of software may be used with the present invention. A preferred software package is created by Mitchell International and is entitled UltraMate. With this software package, the application code is approximately 30 MB and the database is about 600 MB. The Mitchell system or those produced by ADP, CCC and the like are application programs and databases which include data which is used in preparing an estimate on a vehicle. The database includes standard prices for various parts, labor, paint and the like.

The software which is used to form the wired network 12 may be any of the standard network software products, such as Ethernet, Token Ring, 10 Base T and the like. Any network software, such as Windows 95, Windows 3.1, Windows NT and the like may also be used in connection with the present invention. The use of such a system with the relevant software is most clearly shown in FIG. 2.

Figure 2:
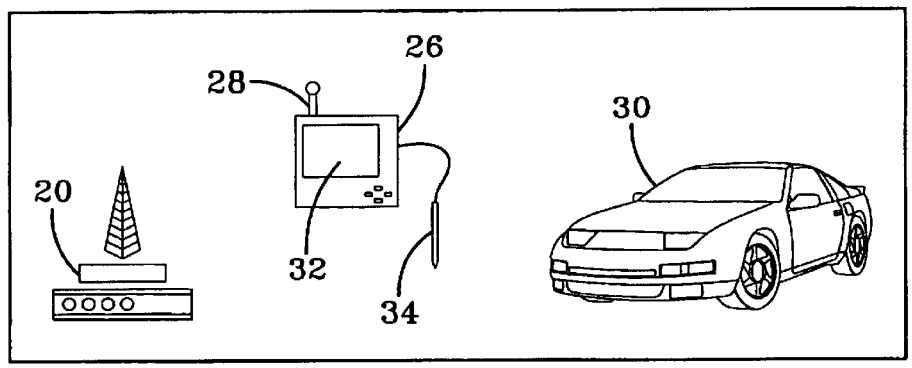
FIG. 2 is a view of the pen technology used in conjunction with the access point near a vehicle in accordance with the present invention.

As shown in FIG. 2, the portable computer 26 is transported near a vehicle 30 which has been damaged. The portable computer 26 must be kept within range of an access point 20 so that the radio transceiver 28 can communicate with the network 10 through the access point 20. Names of various parts of a vehicle are then input into the portable computer 26. These input names are transmitted through the radio transceiver 28 and access point 20 to the server 22.

A database is installed on the server 22. When the input names reach the database on the server 22, the server 22 will transmit pictures and other data regarding the damaged part back through the network 12 to the access point 20, then to the radio transceiver 28 and finally to the portable computer 26. This process just described of transmitting the information to and from the server 22 and the portable computer 26 is called accessing the database. The data which appears on the screen 32 of the portable computer 26 is frequently an exploded view of the damaged part whose name was input into the portable computer 26. In viewing this exploded view, additional parts may be listed which may not have been noticed in a review of the damaged vehicle 30. Additional names of additional parts which are damaged may then be input. Additional information which may be displayed on the screen 32 of the portable computer 26 are the various costs for repairing or replacing a given part. A user may easily determine the appropriate course of action, whether repair or replacement of a damaged part, by viewing the cost of each on the screen 32 of portable computer 26.

Before this process can be begun, an application program must be loaded into the memory of the portable computer 26. The application program is maintained on the portable computer 26 and merely the database is accessed on the server 22. Also prior to this process, the database must be installed on the server 22. The database may be installed on the server 22 in a variety of ways. First, a CD-ROM drive (not shown) may be installed on the server 22 and a CD-ROM which contains the database may be inserted into the CD-ROM drive. Alternatively, a database may be loaded into a hard drive on the server 22. A less preferred option is to enable each portable computer 26 to access a mainframe computer (not shown) and the database may be stored on the mainframe computer. The information on the mainframe computer may be downloaded from the mainframe computer to the portable computer 26. In this way each portable computer 26 can access the database on the server 22 as needed. Another option is to install the database on each portable computer 26. In this way, the portable computer 26 need not access the server 22 to receive data. The database may be directly loaded into the hard drive in the portable computer 26. A less preferred option is that a CD-ROM drive (not shown) may be installed on the portable computer 26 and a CD-ROM may be inserted in the CD-ROM drive.

The process must also include inputting the names of the parts. The inputting may include a variety of steps. The screen 32 may be touch-sensitive. If the screen 32 is touch-sensitive, a visual representation of damaged parts which appears on the screen may be touched by a user. The screen 32 may be touched either by hand or with a pen device 34 which may be attached to the portable computer 26. Alternatively, a keyboard (not shown) may be on one of the portable computers 26 and the names of damaged parts may be typed on the keyboard. Other obvious options include using a mouse or the like.

Once a user has input all the names of all the damaged parts and has completed his or her analysis of the most appropriate way of repairing the damaged vehicle 30, the estimate is finalized and printed. Because of the existence of the network 10, the printing may take place directly from the portable computer 26 via the wireless technology and may end up at one of the printers 18. The printers 18 are shown in FIG. 1 as being dot matrix printers. However, any printer may be used. Once the estimate has been printed, the printed estimate is delivered to a customer who may then take the estimate and have their damaged vehicle repaired.

The process may also include providing another application on the network 10. The application may be capable of taking and storing pictures of the damaged vehicle 30 in order to improve the records of the insurance company. In such a case, the picture taken would be stored with the estimate and the picture-taking application software may be installed on either the server 22 or the portable computer 26 as long as the application software is accessible from the portable computer 26.

At some point in the process, the name of the customer whose vehicle 30 has been damaged must be input. In this way the insurance company can determine which customers are in need of repair. The customers who are expected at an estimating area are typically stored in a mainframe computer (not shown) which is local or regional for each insurance agency. The information which is particular to any given customer can then be accessed by inputting the name of the customer from the portable computer 26. The portable computer may access the mainframe computer and download the information about the customer directly from the mainframe. Alternatively, the information regarding the customers can be downloaded from the mainframe to the server 22 and then further accessed by the portable computer 26 directly from this customer information database on the server 22. An additional alternative is to export the information regarding the customers from the server 22 to each portable computer 26. Once an estimate is complete, the information regarding the final amount of the estimate and the extent of the damage to the damaged vehicle 30 must be transmitted to the main office of the insurance company. Each portable computer 26 contains sufficient memory to allow it to store the estimates and pictures from each damaged vehicle 30 for a given period of time. At some point, however, the data and estimates generated which are stored on the portable computer 26 must be exported. The data is exported from the portable computer 26 to the server 22. Because of the general lack of memory in a portable computer 26 which is sufficiently small to allow for ease of use, this exporting step may need to be done several times in one day. The data which is exported from the portable computer 26 to the server 22 must later be exported from the server 22 to the mainframe computer for the region or area of the insurance company.

Thus, the process for providing an insurance adjustment estimate requires a number of steps. First, the insurance adjusting application must be loaded into a plurality of portable computers 26. Each of the portable computers 26 must be connected to a server 22 by a radio transceiver 28 attached to each portable computer 26 to form a wireless local area network 10. The radio transceiver 28 is capable of transmitting and receiving data.

Next, a database must be installed on the network 10. The network 10 must also include a printer 18 and an access point 20. The access point 20 must be capable of transmitting and receiving data between the server 22 and the radio transceiver 28.

One of the plurality of portable computers 26 is then transported to a vehicle 30 which has been damaged, while keeping the portable computer 26 within range of the access 15 point 20. Names of parts which need to be replaced on the damaged vehicle 30 are then input into the portable computer 26. The resulting estimate is then printed.

The process may and likely will also require the inputting of additional names of additional parts which are damaged. After the database on the network 10 is accessed from the portable computer 26, additional names of additional parts may be input.

In order to maintain the processing speed at an acceptable level, this process does not work like other networks. Instead each of the plurality of portable computers 26 is prevented from communicating with the remainder of portable computers 26.

The installing of the database on the network 10 may include a variety of steps. The installing may include installing a CD-ROM drive in the server 22 and placing a CD-ROM which contains the database into the CD-ROM drive. Alternatively, the installing may take the form of loading the database into the hard drive of the server 22. As additional alternatives, the installing may take the form of loading the database into the hard drive on each portable computer 26 or installing a CD-ROM drive in each portable computer 26 and placing a CD-ROM containing the database into the CD-ROM drive.

The names of the parts may be input in a variety of ways. First, the names of the parts may be input by touching a visual representation of damaged parts which appears on a screen 32 on one of the plurality of portable computers 26. The touching of the visual representation of the damaged parts which appears on a screen 32 on one of the plurality of portable computers 26 may be done with a pen device 34 attached to one of said plurality of portable computers 26. Alternatively, the inputting of names may be done by typing the names of the damaged parts on a keyboard attached to one of the portable computers 26.

The process may begin with inputting the name of the customer whose vehicle has been damaged. This inputting may require accessing a mainframe computer from one of the plurality of portable computers 26 and downloading information from the mainframe computer to one of the plurality of portable computers 26. The inputting may instead require exporting the customer information from the server 22 to each portable computer 26. The process ends with delivering the printed estimate to the customer. Once the process is complete, a user must export data from one of the plurality of portable computers 26 to the server 22. This data must also be exported from the server 22 to the mainframe. In this way, the customer is provided with a printed insurance adjustment estimate.

While certain preferred embodiments of the present invention have been disclosed in detail, it is to be understood that various modifications may be adopted without departing from the spirit of the invention or scope of the following claims.

What is claimed is:

1. A process for providing a printed insurance adjustment estimate, said process comprising the steps of:
   (a) providing at least one portable computer, each said portable computer further comprising insurance adjusting software, each said portable computer adapted to communicate with a server via a wireless local area network, said server comprising a read-only database of automotive data, said server in communication with at least one printer;
   (b) initiating an insurance adjustment estimate for a first damaged vehicle on a first one of said at least one portable computer;
   (c) identifying damaged portions of said first damaged vehicle requiring repair;
   (d) entering information related to said damaged portions in said first one portable computer;
   (e) requesting appropriate automotive data from said read-only database of automotive data on said server;
   (f) receiving said appropriate automotive data thereby compiling an insurance adjustment estimate for said first damaged vehicle;
   (g) printing said insurance adjustment estimate for said first damaged vehicle by transmitting said insurance adjustment estimate over said wireless network to said printer;
   (h) initiating an insurance adjustment estimate for a second damaged vehicle on said first one of said at least one portable computer;
   (i) identifying damaged portions of said second damaged vehicle requiring repair;
   (j) entering information related to said damaged portions in said first one portable computer;
   (k) requesting appropriate automotive data from said read-only database of automotive data on said server;
   (l) receiving said appropriate automotive data thereby compiling an insurance adjustment estimate for said second damaged vehicle; and
   (m) printing said insurance adjustment estimate for said second damaged vehicle by transmitting said insurance adjustment estimate over said wireless network to said printer,
   wherein said insurance adjustment estimate for said first damaged vehicle is provided while a process step (h) through (m) is being performed.

2. The process according to claim 1 wherein said wireless local area network operates on a spread spectrum system selected from the group consisting of frequency-hopping spread spectrum and direct sequence spread spectrum.

3. The process according to claim 1 additionally comprising the steps of:
   (n) storing each said insurance adjustment estimate on said first one of said at least one portable computer, thereby forming a log of estimates; and
   (o) exporting said log of estimates to said server.

4. The process according to claim 3 wherein said insurance adjustment estimate for said first damaged vehicle is provided while a process step (h) through (o) is being performed.

* * * * *